US012564907B2

(12) United States Patent
Shearer

(10) Patent No.: US 12,564,907 B2
(45) Date of Patent: Mar. 3, 2026

(54) INDIUM SOLDER PASTE COMPOSITIONS

(71) Applicant: Ormet Circuits, Inc., San Diego, CA (US)

(72) Inventor: Catherine A. Shearer, San Marcos, CA (US)

(73) Assignee: ORMET CIRCUITS, INC., San Diego, CA (US)

( * ) Notice: Subject to any disclaimer, the term of this patent is extended or adjusted under 35 U.S.C. 154(b) by 910 days.

(21) Appl. No.: 17/787,053

(22) PCT Filed: Jan. 6, 2021

(86) PCT No.: PCT/US2021/012235
§ 371 (c)(1),
(2) Date: Jun. 17, 2022

(87) PCT Pub. No.: WO2021/141932
PCT Pub. Date: Jul. 15, 2021

(65) Prior Publication Data
US 2023/0049614 A1 Feb. 16, 2023

Related U.S. Application Data

(60) Provisional application No. 62/958,384, filed on Jan. 8, 2020.

(51) Int. Cl.
| | |
|---|---|
| *B23K 35/36* | (2006.01) |
| *B22F 1/052* | (2022.01) |
| *B22F 1/107* | (2022.01) |
| *B23K 35/02* | (2006.01) |
| *B23K 35/26* | (2006.01) |

(52) U.S. Cl.
CPC ............ *B23K 35/025* (2013.01); *B22F 1/052* (2022.01); *B22F 1/107* (2022.01); *B23K 35/26* (2013.01); *B23K 35/3618* (2013.01)

(58) Field of Classification Search
None
See application file for complete search history.

(56) References Cited

U.S. PATENT DOCUMENTS

| | | |
|---|---|---|
| 2014/0042212 A1 | 2/2014 | Shearer |
| 2014/0120356 A1 | 5/2014 | Shearer et al. |
| 2014/0131898 A1 | 5/2014 | Shearer et al. |

FOREIGN PATENT DOCUMENTS

| | | |
|---|---|---|
| JP | 2004-202518 A | 7/2004 |
| JP | 2017041442 A | 2/2017 |
| WO | 2014082100 A1 | 5/2014 |
| WO | 2016/174584 A1 | 11/2016 |
| WO | 2019/113208 A1 | 6/2019 |
| WO | 2019/124512 A1 | 6/2019 |

OTHER PUBLICATIONS

International Search Report and Written Opinion, PCT/US2021/012235—Filing Date: Jan. 6, 2021.

*Primary Examiner* — Anthony M Liang
(74) *Attorney, Agent, or Firm* — Robert C. Netter, Jr.; Dann, Dorfman, Herrell & Skillman

(57) ABSTRACT

The present invention relates to paste compositions comprising an indium metal powder; and an organic vehicle. The organic vehicle includes one or more C8-C18 fatty acids; a salt formed from a C4-C6 carboxylic acid and a tertiary alkanolamine; a cationic catalyst; a thixotrope; and a diluent.

14 Claims, 2 Drawing Sheets

INDIUM SOLDER PASTE COMPOSITIONS

This application is a national stage application, filed under 35 U.S.C. § 371, of International Patent Application No. PCT/EP2021/012235 (filed on 6 Jan. 2021) which claims the benefit of U.S. Provisional Patent Application No. 62/958, 384 (filed on 8 Jan. 2020) each of which application is incorporated herein by reference in its entirety.

FIELD OF THE INVENTION

The present invention relates to metal compositions, methods of preparation thereof and uses thereof. More specifically, the present invention relates to paste composi- tions containing indium metal particles that are useful for providing electrical and/or thermal connections between elements in electronic packaging.

BACKGROUND OF THE INVENTION

As the electronics industry moves to devices with increas- ing powder density, the need for new thermal interface materials to transport waste heat has become acute. Thermal greases and phase change materials have long been used to service the thermal dissipation requirements of operating electronic devices, but the thermal conductivity of these conventional materials (<10 W/mK) is becoming increasing inadequate to the current power dissipation needs. Indium metal preforms offer much higher thermal conductivity performance (>80 W/mK) albeit at as considerable cost premium over the conventional materials. Indium is a very soft metal and will easily deform at room temperature to create a conformal interface between the heat source and drain. This ability to conform is critical to realizing the benefit of the higher thermal conductivity of the indium metal.

In many applications, the surfaces of the heat source and drain are substantially flat and a preform is sufficient to accommodate the variations in surface topography to create a conformal interface and gap fill. As the architectures in electronic devices become more complex and three dimen- sional; however, there are instances in which an irregular gap must be bridged. If the indium could be delivered in paste form and thermally processed to a consolidated indium joint, indium could be used to thermally couple these irregular, non-planar configurations.

Many of the characteristics of indium that are favorable for its use as a conformal preform present challenges in the formulation of an indium solder paste. Indium is a very reactive metal and readily oxidizes in air. The oxide coating is beneficial for storing powdered indium because it prevents the powder from fusing at room temperature, but it must be removed so that the indium can consolidate during the thermal processing. Because of the high reactivity of the indium and its oxides, the development of a flux system that will remain latent in storage and application and yet effec- tively reduce the oxide during thermal processing to pro- mote consolidation of the metal is very challenging. Regard- less of the latency of the flux system, some cleaning of the indium powder will occur in the formulated paste. To have adequate pot and shelf life, the indium particles must be held in suspension without coming in direct contact with one another or agglomerates of fused particles will form. Fur- ther, in the process of blending the indium paste, the soft indium metal will shear and smear, thus exposing fresh indium to the flux system, if care is not taken to suspend and isolate the particles. This exposed indium is highly suscep- tible to fusion.

There is therefore a need for an indium solder paste in which the indium particles are prevented from fusing in storage and deposition, but will consolidate under mild thermal processing to form a solid indium thermal interface material. The present disclosure addresses these needs.

SUMMARY OF THE INVENTION

In one of its aspects, the present invention relates to a paste composition comprising: Indium metal powder and an organic vehicle comprising:
- (a) one or more C8-C18 fatty acids,
- (b) a salt formed from a C4-C6 carboxylic acid and a tertiary alkanolamine,
- (c) a cationic catalyst,
- (d) a thixotrope, and
- (e) a diluent.

In the practice of the present invention, the organic vehicle is prepared by mixing together the fatty acid(s), the salt, the cationic catalyst, the thixotrope and any additional organic constituents (e.g. a diluent or solvent); heating the mixture to activate the thixotrope thus forming a gel-like consistency. The indium powder is then mixed into the organic vehicle to form a solder paste suitable for forming indium thermal interface deposits.

The above-described compositions are disposed between a heat generating element and a heat sink element. The paste may be applied using various techniques, including, but not limited to, needle dispensing, stenciling or other methods that would be known to those of skill in the art. Once applied, the described compositions are thermally processed in an oven, on a hot plate, in a reflow furnace or by other means typically employed for the processing of solder. The specific thermal process conditions are dependent upon the application as well as selection of the organic binder con- stituents.

Once thermally processed at a temperature in the range of 160-220 degrees Celsius, the indium will have consolidated into a single mass that thermally, and in some cases, elec- trically couples the heat source and heat sink elements. As a consequence of deposition in an paste format, the deposits formed from compositions of the instant invention form thermal interface junctions that span irregular gaps and conform to non-planar surfaces.

DEFINITIONS

Figure 1:
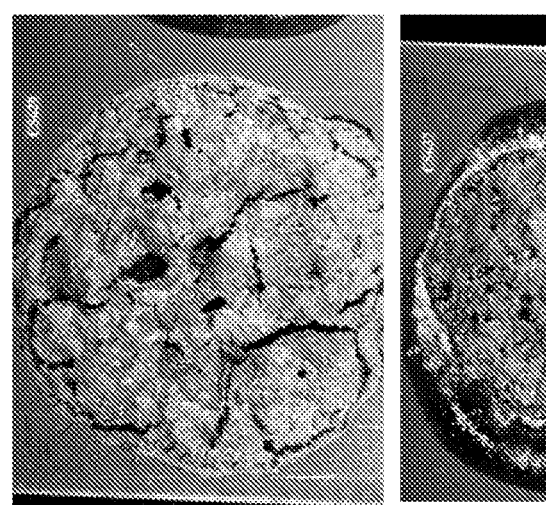
FIG. 1 is an optical microscope image of a top-down view of comparative example CE3 (left) and CE 4 (right) after thermal processing on a hot plate at 200 degrees Celsius. Note the rough, matte surface; lack of consolidation in CE3 and the excessive indium oxide dross of the surface of CE4. In addition, both of these pastes would become an unusable solid in the jar in less than two hours.
Figure 1:
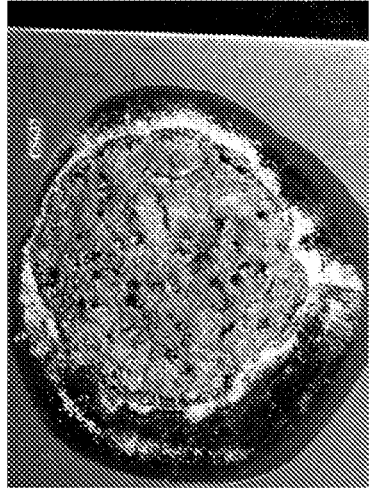
Figure 2:
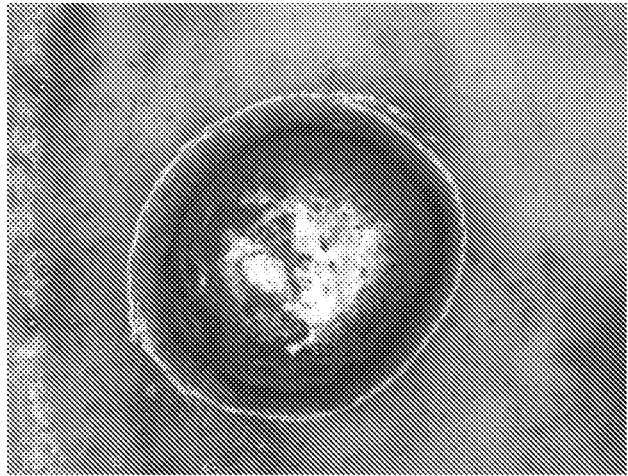
FIG. 2 is an optical microscope image of a top-down view of comparative example CE7 after thermal processing on a hot plate at 200 degrees Celsius. Although consolidation is much improved over CE3 and CE4, the dull, rough surface and lumps suggesting inclusions are undesirable. Further, this paste also exhibited an unacceptably short pot life of less than 8 hours.
Figure 3:
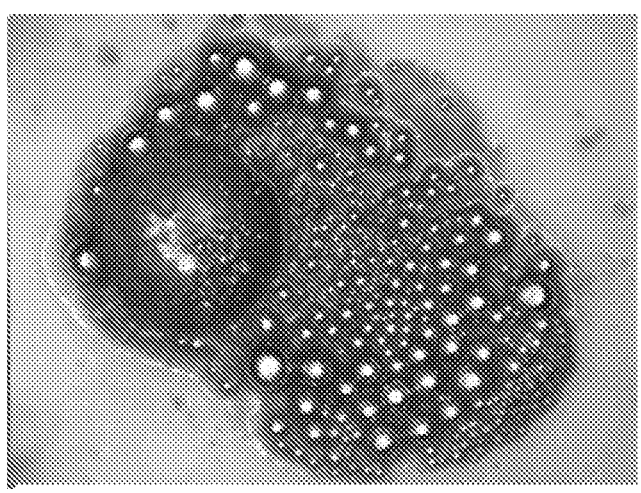
FIG. 3 is an optical microscope image of a top-down view of comparative example CE8 after thermal processing on a hot plate at 200 degrees Celsius. Although consolidation appears to be relatively far advanced and the smooth round shapes suggest a lack of inclusions, there are extensive satellites formed around the primary consolidated deposit and extensive flux residue remains. The satellite deposits have a potential to detach from the primary deposit and cause shorting and the cleaning required to remove the residual flux chemistry introduces an additional step. Further, CE8 must be applied as a two-part system or the pot life is less than 30 minutes. Ensuring consistent application and mixing of the two parts during deposition significantly complicates the deployment of such a solution.
Figure 4:
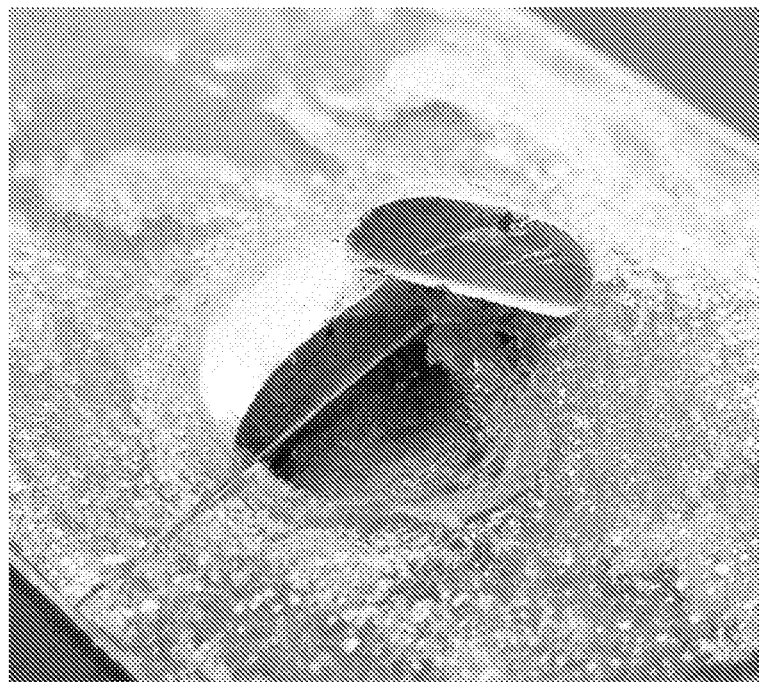
FIG. 4 is an optical microscope image of a top-down view of invention example IE1 after thermal processing on a hot plate at 200 degrees Celsius. Note the shiny appearance, round shape and lack of excessive flux residue. Further, the slice through the consolidated deposit indicates that the deposit is indeed well-consolidated and free of inclusions.

Unless otherwise stated, the following terms used in the specification and claims shall have the following meanings for the purpose of this Application.

In this application, the use of the singular includes the plural, and the words "a", "an" and "the" mean "at least one", unless specifically stated otherwise. Furthermore, the use of the term "including", as well as other forms such as "includes" and "included", is not limiting. Also, terms such as "element" or "component" encompass both elements or components comprising one unit and elements or components that comprise more than one unit, unless specifically stated otherwise. As used herein, the conjunction "and" is intended to be inclusive and the conjunction "or" is not intended to be exclusive, unless otherwise indicated. For example, the phrase "or, alternatively" is intended to be exclusive. As used herein, the term "and/or" refers to any combination of the foregoing elements including using a single element.

The term "about" or "approximately," when used in connection with a measureable numerical variable, refers to the indicated value of the variable and to all values of the variable that are within the experimental error of the indicated value (e.g., within the 95% confidence limit for the mean) or within ±10 percent of the indicated value, whichever is greater.

Whenever it appears herein, a numerical range, such as "45-55", refers to each integer in the given range; e.g., "45-55%" means that the percentage can be 45%, 46%, etc., up to and including 55%. Where a range described herein includes decimal values, such as "1.2% to 10.5%", the range refers to each decimal value of the smallest increment indicated in the given range; e.g. "1.2% to 10.5%" means that the percentage can be 1.2%, 1.3%, 1.4%, 1.5%, etc. up to and including 10.5%; while "1.20% to 10.50%" means that the percentage can be 1.20%, 1.21%, 1.22%, 1.23%, etc. up to and including 10.50%.

As used herein, the term "substantially" refers to a great extent or degree. For example, "substantially all" typically refers to at least about 90%, frequently at least about 95%, often at least 99%, and more often at least about 99.9%.

The term "alloy" refers to a mixture containing two or more metals, and optionally additional non-metals, where the elements of the alloy are fused together or dissolved into each other when molten. The notation used herein for alloy compositions lists two or more elements using their IUPAC symbols separated by a forward slash ("/"). When given, the proportions of the elements in the alloy are indicated by subscripts corresponding to the weight percent of the element in the alloy. For example, Sn/Bi represents an alloy of tin (Sn) and bismuth (Bi), which can be any proportion of these two elements. Sn(60)/Bi(40) represents a specific alloy of tin and bismuth that contains 60 percent by weight of tin and 40 percent by weight of bismuth. Where a range is given for the weight percent of an element(s) in an alloy, the range indicates that the element can be present in any amount within the indicated range. For example, Sn(70-90)/Bi(10-30) refers to an alloy containing from 70 weight percent to 90 weight percent of tin, and from 10 weight percent to 30 weight percent of bismuth. Thus, alloys encompassed by the "Sn(70-90)/Bi(10-30)" range include, but are not limited to: Sn(70)/Bi(30), Sn(71)/Bi(29), Sn(72)/Bi(28), Sn(73)/Bi(27), Sn(74)/Bi(26), Sn(75)/Bi(25), Sn(76)/Bi(24), Sn(77)/Bi(23), Sn(78)/Bi(22), Sn(79)/Bi(21), Sn(80)/Bi(20), Sn(81)/Bi(19), Sn(82)/Bi(18), Sn(83)/Bi(17), Sn(84)/Bi(16), Sn(85)/Bi(15), Sn(86)/Bi(14), Sn(87)/Bi(13), Sn(88)/Bi(12), Sn(89)/Bi(11), and Sn(90)/Bi(10). Furthermore, Sn(70-90)/Bi(10-30) represents alloys in which the specific proportion of the elements Sn and Bi may vary from Sn(70)/Bi(30) to Sn(90)/Bi(10) inclusive of proportions of Sn varying from 70 up to 90 weight percent and Bi inversely varying from 30 down to 10 weight percent.

The terms "melting temperature" or "melting point," as used herein, refer to the temperature (a point) at which a solid becomes a liquid at atmospheric pressure.

The term "differential scanning calorimetry" ("DSC") refers to a method of thermal analysis in which the difference in the amount of heat required to increase the temperature of a sample and reference are measured as a function of temperature. DSC is used to investigate the melting behavior of metal/metal alloy particles.

In "transient liquid phase sintering" or "TLPS", the liquid phase exists for only a short period of time as a result of the homogenization of the metals to form a mixture of solid alloy and/or intermetallic species. The liquid phase has a very high solubility in the surrounding solid phase, thus diffusing rapidly into the solid and eventually solidifying. Diffusional homogenization creates the final composition.

The "Coefficient of Thermal Expansion" or "CTE" is a term of art describing a thermodynamic property of a substance. The CTE relates a change in temperature to the change in a material's linear dimensions.

The term "processing temperature" or "T1" as used herein in reference to solder paste compositions is the temperature at which the metal or metal alloy particles become molten and are fused into a consolidated structure.

The terms "intermetallics" or "intermetallic species" refer to a solid material, which is comprised of two or more metal atoms in a certain proportion that has a definite structure which differs from those of its constituent metals.

The section headings used herein are for organizational purposes and are not to be construed as limiting the subject matter described. All documents, or portions of documents, cited in this application, including, but not limited to, patents, patent applications, articles, books, and treatises, are hereby expressly incorporated herein by reference in their entirety for any purpose. In the event that one or more of the incorporated literature and similar materials defines a term in a manner that contradicts the definition of that term in this application, this application controls.

DETAILED DESCRIPTION

It is to be understood that both the foregoing general description and the following detailed description are illustrative and explanatory, and are not restrictive of the subject matter, as claimed.

In one of its aspects, the present invention relates to a paste composition comprising: Indium metal powder and an organic vehicle comprising:

(a) one or more C8-C18 fatty acids, (b) a salt formed from a C4-C6 carboxylic acid and a tertiary alkanolamine, (c) a cationic catalyst, (d) a thixotrope, and (e) a diluent.

In the practice of certain embodiments of the invention, components A-D are first mixed together, heated to a temperature of approximately 40-60 degrees Celsius for a period of about 5 to 20 minutes to activate the thixotrope and effect a gelatinous consistency, and then stirred again to ensure homogeneity. Next, the indium powder is introduced gradually with continuous mixing into the gelatinous organic mixture. Typically, the particles powder will be present in an amount that is about 80-90 weight percentage (wt %) of the mixture and the organic mixture will constitute the balance.

The indium particles used in the preparation of invention compositions may range in size from 1-50 micron across the largest dimension. The particles may be present as spheres, substantially spherical, rods, needles, flakes and the like. Presently preferred are spherical or substantially spherical particles such as are produced through the process of gas atomization. When present as spherical or substantially spherical particles, the indium metal particles are preferably in the range of 5-40 micron in diameter, or more preferably in the range of 10-30 micron in diameter. Large particles tend to be detrimental to deposition due to issues such as clogging. Very small particles tend to agglomerate together in clumps that do not properly consolidate during thermal processing.

The one or more C8-C18 fatty acids serve as an acidic medium to reduce the oxides on the indium powder during thermal processing, with the fatty tails providing lubricity during deposition, aiding in maintenance of separation of the particles and acting as a buffer between the acid flux and particle surfaces during storage. The selection of fatty acids is predicated on a balance between the level of flux activity and the lubricity and barrier functions from the fatty tails. Saturated fatty acids are presently preferred. Decanoic and dodecanoic acid and mixtures thereof are most preferred.

The tertiary alkanolamine is thought to provide a transport function for removal of the indium oxides and flux by-products to effect consolidation of the indium metal without substantial inclusions of organic or oxide species. When alkanolamines are added directly to the composition, the paste formulation becomes set and unusable in a very short period of time. Buffering the tertiary alkanolamine with a carboxylic acid improves the latency of the paste composition, but these tertiary amine-carboxylic acid salts are susceptible to dissolution in a number of diluents which erodes the latent behavior.

One basis of the invention of the present disclosure is the discovery that the use of a short chain carboxylic acid to form a salt with the tertiary alkanolamine renders a more stable salt that is less susceptible to dissolution and loss of latency. The discovery facilitates the development of a stable solder paste that also achieves the objective of indium consolidation with few inclusions.

Presently preferred alkanolamines include mono- and diamine structures bearing short chain alkanols. The short chain alkanol substituents borne by the nitrogen atoms may be selected from methanol, ethanol, propanol and isopropanol. Most preferred is a tertiary diamine bearing either ethanol, propanol or isopropanol substituents.

The C4-C6 carboxylic acids have been discovered to provide salt complexes that are particularly resistant to dissolution in the presence of diluents commonly used in the practice of the present invention. More effective are C4-C6 carboxylic acids bearing additional hydroxy functionality. Presently preferred is bis-hydroxymethyl propionic acid.

Another basis of the invention of the present disclosure is the discovery that the use of a solid cationic catalyst as a flux activator preserves the latency of the formulation because the catalyst does not become active until the processing temperature. Without the catalyst, the consolidated deposit contains an unacceptable amount of non-indium inclusions and the surface of the consolidated deposit is dull with a coating of indium oxides and flux by-products. With the inclusion of the catalyst, the consolidated deposit is substantially free of inclusions and the surface of the consolidated deposit is shiny. Without being restricted to particular theory of mechanism, the inventor postulates that the cationic catalyst renders the acid flux more effective in reducing the oxides so that the transport function of the tertiary alkanolamine is not overwhelmed. Presently preferred cationic catalysts are diaryliodonium and triarylsulfonium compounds. Most preferred are diaryliodonium compounds such as PS 2506 offered by the Polyset Corporation.

A thixotrope is used to provide body and structure to the organic mixture such that it can hold the indium particles in suspension and keep them separated from one another during storage and deposition. In the practice of the invention, it has been discovered that thixotropes that form gel-like hydrogen bonded structures are particularly effective. Generally, these waxy thixotropes are dispersed in the organic medium whereupon, with mild heating in the range of 40-60 degrees Celcius for a period of 5-20 minutes, the polar groups within the organic medium cause swelling of the thixotrope which results in the extension of multiple functional groups capable of forming a hydrogen-bonded structure. After heating and mild stirring, a homogenous gel-like structure is provided into which the indium powder may be dispersed. Presently preferred thixotropes are polyamide waxes.

In the practice of the present invention additional additives such as antifoams (such as polydimethylsiloxane), stabilizers and antioxidants may be incorporated to facilitate enhanced storage life, use life or ease of deposition.

Further, diluents are added to invention compositions to optimize the consistency of the paste composition for, for instance, a particular deposition method. Diluents contemplated for use include, but are not limited to, glycol ethers, polyols and functionalized versions thereof.

The skilled artisan will recognize that the constituent components described herein may be varied considerably in proportion to meet the specific storage, pot life, deposition method, processing method and characteristics of the end use application. Generally, compositions of the present disclosure will contain:

a) 80-90 weight percent indium metal powder b) 2.0-8.0 weight percent C8-C18 fatty acids, c) 0.5-3 weight percent of a salt formed from a C4-C6 carboxylic acid and a tertiary alkanolamine, d) 0.1-1.0 weight percent of a cationic catalyst, e) 0.3 to 1.5 weight percent of a thixotrope, and f) 5 to 10 weight percent of a diluent.

In conventional solder reflow, the processing temperature is typically selected to be 5-50° C. in excess of the melting temperature of the solder paste to ensure that all the particles become molten and fluid. When invention compositions are used for the attachment of electronic components, standard solder reflow practices may be followed.

Applications of Inventive Indium Solder Paste Compositions

The consolidated and conformal indium deposits formed from invention compositions are particularly useful for thermal transfer between a heat source and a heat sink. Examples of heat sources include, but are not limited to, electronic devices and the substrates to which such devices may be attached.

Further, because the indium metal is reactive with a variety of metallic surfaces, paste compositions of the instant invention may also be used to electrically and/or mechanically conjoin two elements in an electronic device or may be used to form a composite structure. Exemplary applications in which inventive compositions may be used include connecting semiconductor dies to packaging elements; connecting packaged semiconductor components to printed circuit boards; connecting other discrete components to electronic substrates; attaching discrete components to leads; forming connections between stacked die; forming circuit traces; filling holes in electronic substrates; interconnecting circuit layers in printed circuit boards and/or semiconductor packages; forming collection grids for solar panels, and the like.

The indium solder paste compositions of the invention can be applied using various techniques, including, but not limited to, needle dispensing, stenciling, screen printing, ink jetting, extrusion, casting, spraying and other methods that will be known to those of skill in the art, such as methods that form patterned deposits to which electronic components may then be attached.

After deposition, components (e.g., electronic components) are contacted with the deposited invention composition to form an assembly. Any diluents present in the composition are evolved at mildly elevated temperature, typically in the range of 60-150° C., and then the assembly is thermally processed by raising it to a temperature above the melting temperature of the indium powder.

process conditions are dependent upon the application, intended use, and the specific indium solder paste composition.

EXAMPLES

Reference will now be made to more specific embodiments of the present disclosure and experimental results that provide support for such embodiments. However, Applicants note that the disclosure below is for illustrative purposes only and is not intended to limit the scope of the claimed subject matter in any way.

Example 1: Comparative Examples (CE) 1-5

In the development of invention compositions, many formulations were prepared using common practices and constituents from other types of paste materials.

In comparative example (CE1) the indium powder used had undergone agglomeration and fusion in storage due to poor handling and environmental control. When blended with an organic composition typically used in the consolidation of Cu—Sn systems, the paste simply dried during thermal processing and failed to consolidate. Suspecting that the quality of the indium powder was suspect due to the poor storage and handling conditions, fresh indium powder of good quality was obtained and CE2 was prepared using the same organic vehicle. Again, the paste would only dry to a cement-like consistency and would not consolidate.

In CE3 and CE4, the metal loading was decreased to promote greater fluidity and the flux activity was increased. Consolidation improved, particularly with the larger powder size, but the pot life of the pastes was very short due to premature reaction with the flux chemistry and spontaneous fusion of the powders.

In CE5, the metal loading was yet further reduced and a thixotrope was added to prevent direct contact between the particles and spontaneous fusion. While an improvement, the paste still had an unacceptable pot life and the consolidated deposit had many inclusions and satellites.

| | CE1 | CE2 | CE3 | CE4 | CE5 |
|---|---|---|---|---|---|
| Indium powder (10 um supplier 1) | 92.25 | | | | |
| Indium powder (10 um supplier 2) | | 92.25 | 90.09 | | |
| Indium powder (20 um supplier 2) | | | | 90.09 | 88.97 |
| 4-hydroxybenzoic acid-N,N,N',N' tetrakis (2-hydroxyethyl) ethylene diamine salt (1:2 molar) | 0.85 | 0.85 | | | |
| oleic acid-N,N,N',N' tetrakis (2-hydroxyethyl) ethylene diamine salt (1:1 molar) | 1.38 | 1.38 | | | |
| lauric acid-N,N,N',N' tetrakis (2-hydroxyethyl) ethylene diamine salt (1:1 molar) | | | 9.01 | 9.01 | 7.12 |
| BisF epoxy resin | 0.83 | 0.83 | | | |
| 2-butoxy-ethoxy ethanol | 4.24 | 4.24 | | | |
| polydimethylsilane (1000 Da) | 0.07 | 0.07 | | | 0.09 |
| polyamide wax | 0.22 | 0.22 | | | 0.27 |
| Epoxy silane coupling agent | 0.15 | 0.15 | | | |
| Tripropylene glycol n-butyl ether | | | 0.90 | 0.90 | 3.56 |
| Total | 100 | 100 | 100 | 100 | 100 |

The compositions of the invention can be thermally processed in an oven, in a reflow furnace, in thermocompression equipment, on a hot plate, or by any other available means, such as means typically employed for the processing of solder. The skilled artisan will be aware of additional methods that are typically employed for the processing of solder that will be suitable for processing the indium solder paste compositions described herein. The specific thermal

Example 2: Comparative Examples 6-8

In comparative examples 6-8, the metal loading was further reduced, and some alternative diluents were added to better maintain the separation of the particles in the gel matrix. Further, the use of solid carboxylic acids (glutaric) were explored to prevent premature reaction between the flux and the indium powder. Lastly, different means were explored to incorporate the tertiary alkanolamine such that it could aid in the transport of flux byproducts out of the consolidated joint, but without causing the indium to spontaneously fuse. Although the two-part paste could achieve all of the desired characteristics, adding a drop of CE8 part two to each paste deposit, this is not an ideal application method.

Example 3: Invention Examples 1 (IE1)

Example 3 is the composition of an indium solder paste of the present invention. The combination of medium chain fatty acids as the fluxing medium, a dissolution-resistant carboxylic acid-tertiary alkanolamine transport agent and a latent flux catalyst provided a stable paste that could be kept at room temperature for over 24 hours, deposited easily with syringe dispense, and iii. a cationic catalyst,
iv. a thixotrope, and
v. a diluent.
2. The paste composition according to claim 1, wherein said diluent is a glycol ether, a polyol or functionalized derivatives thereof.
3. The paste composition according to claim 1, wherein said indium metal powder constitutes 80-90 weight percent of the total composition.
4. The paste composition according to claim 1, wherein said indium particles are spherical.
5. The paste composition according to claim 1, wherein said indium particles are present in a size range from 1 to 50 micron in diameter.
6. The paste composition according to claim 1, wherein said indium particles are present in a size range from 5 to 40 micron in diameter.

| | CE6 | CE7 | CE8 (part 1) | CE8 (part 2) |
|---|---|---|---|---|
| Indium powder (20 um supplier 2) | 82.72 | 82.90 | 83.16 | |
| dimethyl propionic acid terminated polyol | 3.68 | 1.55 | | |
| tetraethylene glycol | | 1.55 | 1.04 | |
| N,N,N',N' tetrakis (2-hydroxyethyl) ethylene diamine | 1.38 | | | |
| glutaric acid | | | 4.16 | |
| decanoic acid | 5.51 | 5.18 | 1.04 | |
| lauric acid-N,N,N',N' tetrakis (2-hydroxyethyl) ethylene diamine salt (1:1 molar) | | 0.83 | | |
| polydimethylsiloxane (1000 Da) | 0.46 | 0.41 | 0.42 | |
| cationic catalyst PC 2506 (Polyset Corp) | 0.28 | | | |
| Tripropylene glycol n-butyl ether | 5.97 | 6.74 | 9.36 | |
| polyamide wax | 0.92 | 0.83 | 0.83 | |
| triethanolamine | | | | 20.00 |
| isopropanol | | | | 80.00 |
| Total | 100 | 100 | 100 | 100 | consolidated to a nearly inclusion-free, shiny consolidated mass when processed on a hot plate at 200 degrees Celsius.

| | IE 1 |
|---|---|
| Indium powder (20 um supplier 2) | 85.74 |
| dimethyl propionic acid terminated polyol | 0.54 |
| tetraethylene glycol | 0.54 |
| decanoic acid | 4.29 |
| bis-hydroxymethyl propionic acid-N,N,N',N' tetrakis (2-hydroxyethyl) ethylene diamine salt (1:1 molar) | 0.86 |
| polydimethylsiloxane (1000 Da) | 0.43 |
| cationic catalyst PC 2506 (Polyset Corp) | 0.32 |
| Tripropylene glycol n-butyl ether | 6.43 |
| polyamide wax | 0.86 |
| Total | 100 |

The invention claimed is:
1. A paste composition comprising:
a. an indium metal powder comprising indium particles; and
b. an organic vehicle comprising:
    i. one or more C8-C18 fatty acids,
    ii. a salt formed from a C4-C6 carboxylic acid and a tertiary alkanolamine,

7. The paste composition according to claim 1, wherein said indium particles are present in a size range from 10 to 30 micron in diameter.
8. The paste composition according to claim 1, wherein said fatty acid is selected from the group consisting of decanoic, dodecanoic, myristic, palmitic, stearic, and combinations thereof.
9. The paste composition according to claim 1, wherein said carboxylic acid is bis-hydroxymethyl-propionic acid.
10. The paste composition according to claim 1, wherein said tertiary alkanolamine is a mono- or a diamine molecule.
11. The paste composition according to claim 1, wherein each alkanol substituent of said tertiary alkanolamine is independently selected from methanol, ethanol, propanol and isopropanol.
12. The paste composition according to claim 1, wherein said cationic catalyst is selected from diaryliodonium and triarylsulfonium compounds.
13. The paste composition according to claim 1, wherein said thixotrope is a polyamide wax.
14. The paste composition according to claim 1, further comprising polydimethylsiloxane.

* * * * *